United States Patent Office 3,480,229
Patented Nov. 25, 1969

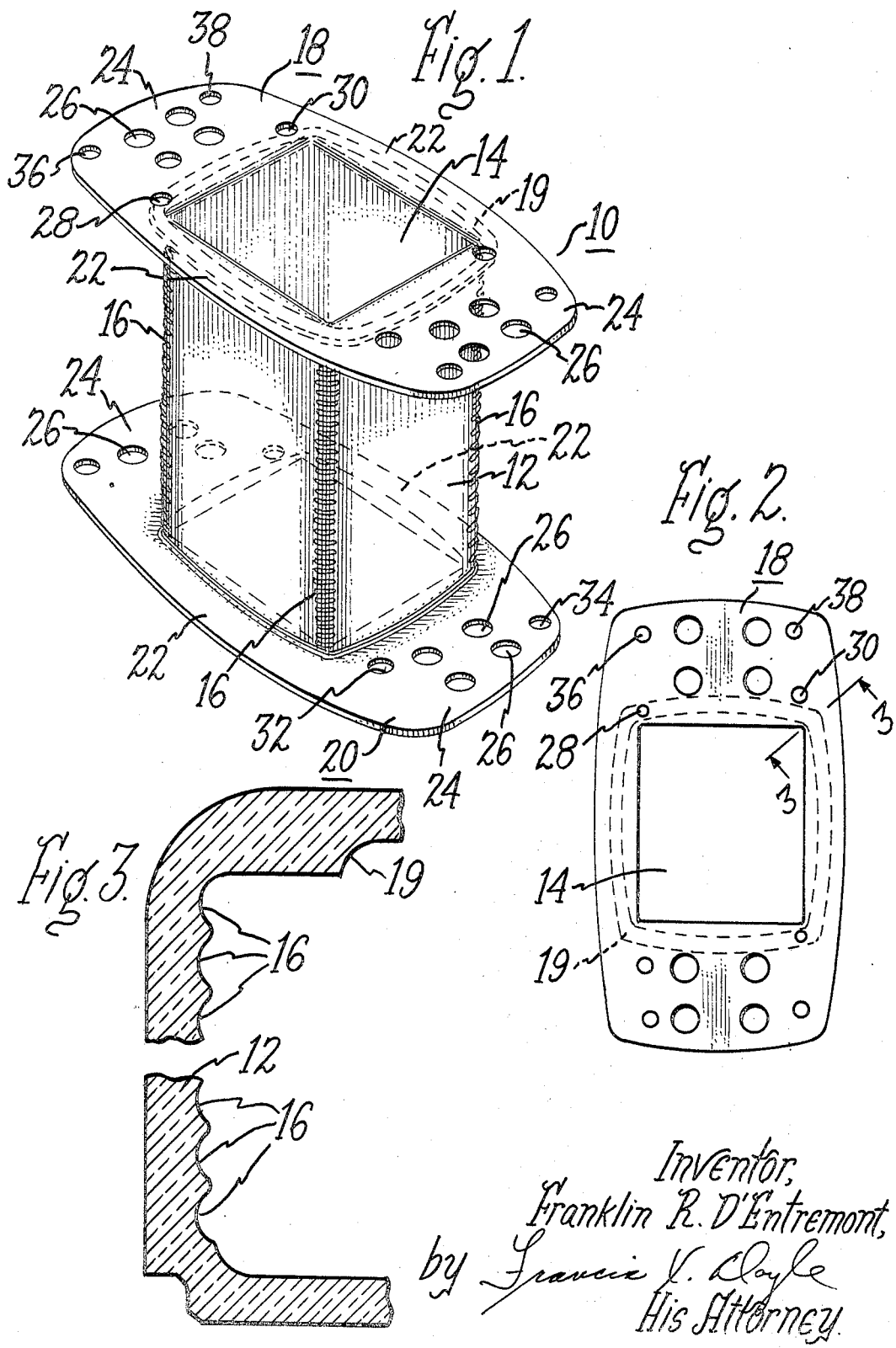

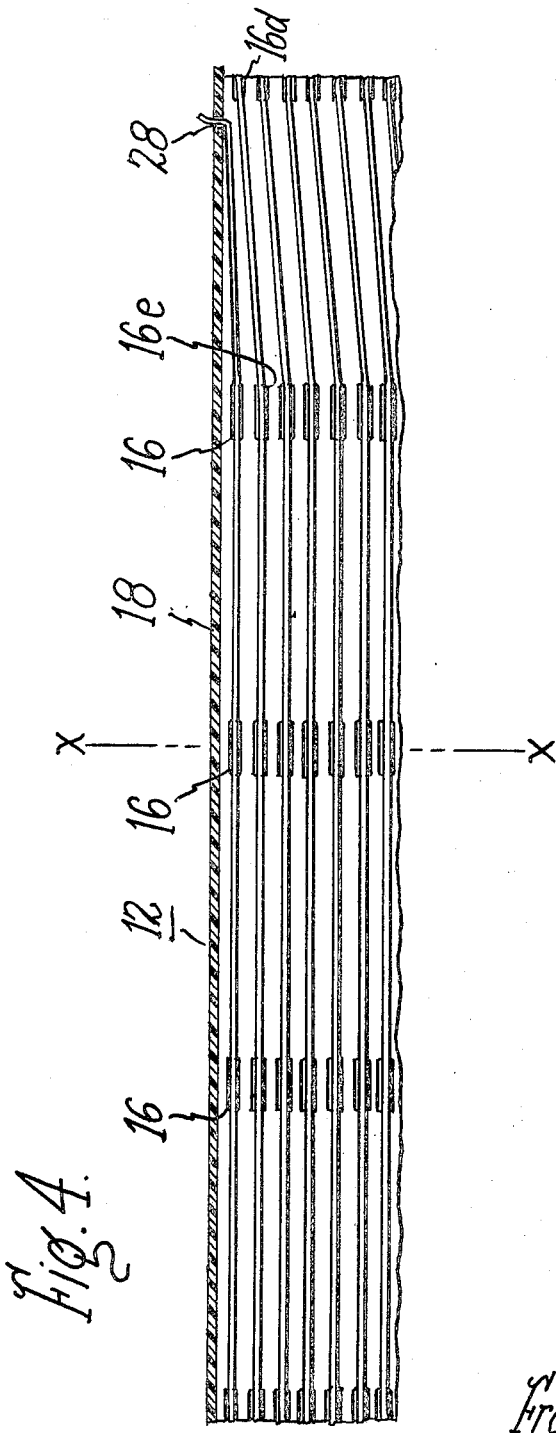

---

3,480,229
COIL WINDING FORM
Franklin R. D'Entremont, Dover, N.H., assignor to General Electric Company, a corporation of New York
Filed June 8, 1967, Ser. No. 644,521
Int. Cl. B65h 75/14; H01f 27/30
U.S. Cl. 242—118.4                                    1 Claim

---

ABSTRACT OF THE DISCLOSURE

A coil winding form for winding a plurality of coils for use in an instrument transformer. The winding form is of insulating material to provide desired insulation between the coil and its core. The base or arbor of the form is square shaped in cross section, and is provided with an equal plurality of serrations on each edge of the arbor for obtaining precision winding with parallel turns perpendicular to the center line of the winding form on three sides of the coil, the four sides of the coil providing progression between adjacent turns. Flanges are provided with openings in the flanges at the desired start and stop position of each of the windings.

---

BACKGROUND OF INVENTION

This invention relates to coil winding forms and more particularly, to a coil winding form for use in winding a plurality of coils on a single form, particularly useful in instrument transformers.

It has been well known in the coil winding art to provide various types of winding forms on which coils may be wound. These forms are usually permanent forms with the coil, such permanent forms being desirable since they provide insulation for the coil from ground or core members, and also, provide a means for holding the coil in a desired shape. Because of these advantages, the use of permanent coil winding forms has increased, especially in the transformer held, particularly in the instrument transformer field. However, in making precision wound coils it is usual to use a removable winding arbor and some type of binder must be used to hold the various turns in the desired position when the arbor has been removed. It is considered desirable to provide a coil winding form of a permanent nature which will be useful in winding precision coils and which will also provide desired core to coil insulation for such coils.

In the use of winding forms, problems arise with respect to the various leads ends of the coils. This is especially true when more than one coil or winding is wound on a single form. It has been proposed to provide slots in the flanges of the winding form to allow the lead end of the coil to be taken from the start of the coil. Such construction is shown in Patent No. 3,083,930. However, this is not considered desirable where more than one coil is wound on a single form, especially if the coils are substantially different voltage ratings, such as, for example, high and low voltage windings of an instrument transformer. Where a slot is provided and the leads are brought out through such slot, it is, of course, necessary to provide additional insulation means between the start and stop winding of each coil and also between the leads of the coils of different voltage rating. Where a plurality of slots are provided, they tend to weaken the flanges of the coil form and also require some means to hold the lead in the desired position within the slot.

It is accordingly, an object of this invention to provide a novel permanent winding form for precision winding of a plurality of coils.

A further object of this invention is to provide a novel permanent winding form having a plurality of spaced openings in the flanges thereof for lead wires of each coil wound on such form.

Yet another object of this invention is to provide a novel winding form in which the major portion of each turn is perpendicular to the center line of the axis of such winding form.

SUMMARY OF INVENTION

Briefly, in one form, the winding form of this invention comprises an arbor portion of substantially square cross section having integral flanges on each end of the arbor. Each winding edge of the arbor is provided with an equal plurality of serrations spaced along such edge to provide precision placement of turns. The flanges are provided with a plurality of spaced holes placed to receive the start and finish leads of a plurality of coils wound on the winding form.

The invention which is sought to be protected will be particularly pointed out and distinctly claimed in the claim appended hereto. However, it is believed that this invention and the manner in which its various objects and advantages are obtained as well as other objects and advantages thereof, will be better understood from the following detailed description of a preferred embodiment thereof, particularly when considered in the light of the accompanying drawing.

BRIEF DESCRIPTION OF DRAWING

FIGURE 1 is a perspective view of one form of winding form according to this invention;

FIGURE 2 is a top view of the winding form shown in FIGURE 1;

FIGURE 3 is a partial sectional view on an enlarged scale taken on the line 3—3 of FIGURE 2; and FIGURE 4 is a view showing the partial development of the first layer wound on the winding form according to this invention.

DESCRIPTION OF PREFERRED EMBODIMENT

This invention relates to a winding form which is useful for winding a plurality of precision windings on a single form. The winding form has a plurality of equally spaced serrations on each edge of the winding arbor and integral flanges with spaced openings to provide for the start and stop leads of each coil or winding wound on the form.

The present preferred embodiment is specifically described in the remaining portion of the specification. However, it will be apparent to those skilled in this art that various constructional details may be changed without departing from the scope of the defined invention.

Referring now to the drawings in which like numerals are used to indicate like parts throughout and considering especially FIGURE 1, there is shown a perspective view of a winding form 10 according to the preferred embodiment of this invention. Winding form 10 includes an arbor or winding base 12 substantially square shaped in cross section with a window opening 14. As will be understood, in most instances, the window opening 14 will be utilized to receive the core member for use with the coils, when such coils wound on the form 10 are used in an induction apparatus. Each edge of the arbor 12 is provided with an equal plurality of serrations 16 which are equally spaced along the arbor 12 as more clearly appears from FIGURE 3 of the drawings. Winding form 10 has integral flanges 18 and 20 at opposite ends of the arbor 12 as shown.

Flanges 18 and 20 are preferably rectangular in shape with very small flange portions 22 on two opposite sides of the arbor 12, and the elongated flange portions 24, which are substantially equal in length to the thickness of the coils (not shown) to be wound on the form 10, on the other two opposite sides of the arbor 12. Flanges 18 and 20 of this shape provide the flange portions 24 which aid in holding the coils in the desired shape. It also enables the more easy impregnation of the coils which are wound on the winding form 10 due to the small flange portions 22 which readily allow the impregnating material to enter the various layers of the coils wound on the winding form 10. It should also be noted that a plurality of holes 26 are provided on the elongated flange portions 24. As will be understood, these holes 26 also aid in impregnating the wound coil by providing a ready means of entry of the impregnating material into the coils wound behind the elongated flange portions 24. It will be apparent to those skilled in the art that the use of the holes 26 provides means to enable the impregnation of the various layers of the coil wound on the winding form, without detracting too greatly from the strength of the elongated flange members 24, which are useful in holding the coil in the desired shape prior to the impregnation.

In the form shown in FIGURES 1 and 2, the winding form 10 is designed to be used for winding three coils. The coils will include an inner, low voltage coil, a middle, high voltage coil and an outer, low voltage coil. Spaced holes are provided on the flange portion 24 to allow entry and exit of the start and stop leads of each coil. As is shown in FIGURES 1 and 2, a hole 28 is provided in flange 18 at the edge of the arbor 12 to provide the exit for the starting lead of the coil to be wound on form 10. The second or stop lead for this coil which, in the particular form shown, will be the inner, low voltage coil, will exit at hole 30 in flange 18. An internal shelf or step 19 may be provided on flange 18 to allow an extra turn to be wound on the first coil, if desired. Hole 30 is at the edge of this shelf 19 as shown. The lead for the starting turn of the middle coil will exit from hole 32 on flange 20, while the lead from the last or finish turn of this coil, will exit from hole 34 on flange 20. The outer winding will have its first or start lead exit from a hole 36 on flange 18, while its finish or stop lead will exit from hole 38 on flange 18.

It will be noted that each of flanges 18 and 20 have duplicate sets of start and finish holes on each of flange portions 24. This allows the windings to be started on either side of arbor 12 and also allows the center winding to be brought out either on the same side as the other coils or on the opposite side, in the manner particularly described with reference to FIGURE 1.

It will, of course, be apparent to those skilled in the art that the various start and stop openings in the flange portion 24 of each of flanges 18 and 20 will be spaced as desired along the flange to provide the start and stop openings in accordance with the thickness of each coil to be wound around the coil form. Obviously, where only two windings are to be wound, a high and low voltage winding for example, it would be only necessary to provide one set of start and stop openings on each of the flanges 18 and 20. Of course, it will be apparent that, if desired, more than three coils could be wound on the single winding form, and additional start and stop openings would be provided on flanges 18 and 20 to provide for the start and stop leads of any additional coils to be wound. It will also be apparent that the openings 26 which are useful for impregnating the coil which has been wound on the winding form 10 may be spaced as desired and may be increased or decreased in accordance with the requirement for impregnation and the strength of the flanges 18 and 20. Obviously, such specific details as these will depend in great measure on the type of coils to be wound on the winding form and the dimensions of such coils.

In the preferred embodiment, it is desired that the winding form be of an insulating material, the presently preferred material being a glass reinforced nylon. Of course, it will be apparent to those skilled in the art that various other types of insulating material may be used in making the coil form. However, as will be understood, the insulation used must be sufficient to insulate the coils wound on the form from ground or the core member which may be placed in the window opening 14 of the winding form.

FIGURE 3 shows an enlarged view of the serration 16 on the edges of the arbor 12. As can be seen from FIGURE 3, the serrations 16 are of uniform size and are equally spaced along the edge of the arbor 12. This allows for precision winding, with the major portion of each turn being parallel to each other and perpendicular to the center line or axis of the arbor 12. This is more clearly shown in FIGURE 4 which is a partial development of the first layer to be wound on the arbor 12.

As is shown in FIGURE 4, the start lead 40 of the first winding, exits from opening 28 in flange 18. The first turn of the winding goes around arbor 12 fitting in each of the serrations 16 which are nearest the flange 18. From the last serration in the first group, shown as 16d, the winding progresses at an angle, as shown, to the next group of serrations starting with serration 16e. Each turn of the winding progresses in a similar manner across the winding form and back until the end of the last turn, which will exit from hole 30 in flange 18 (see FIGURE 1). As is apparent from FIGURE 4, each of the turns of the winding on arbor 12 has its major portion, that is, ¾ of its length, perpendicular to the center line of the arbor, which is indicated by the center line x—x in FIGURE 4. The remaining quarter is used to provide the progression from one turn to the next turn along the coil, as shown. As will be apparent, each succeeding coil is wound in a similar manner on the winding form 10 and will exit and enter the winding form through the spaced openings or holes in the flanges 18 and 20.

From the above it will be apparent that this invention provides a novel winding form for winding a plurality of coils on a single form. As will be apparent by means of this invention, a permanent winding form may be provided for a plurality of coils and means are provided for both precision winding of such coils and for allowing the exit of the various leads of each coil without substantially weakening the flanges of the winding form, and without requiring additional work or material to accurately place the winding leads in such form. While there has been shown and described the present preferred embodiment of this invention, it will, of course be apparent to those skilled in the art that various changes may be made without departing from the spirit and scope of the invention.

What is claimed as new and which it is desired to secure by Letters Patent of the United States is:

1. A winding form for winding a plurality of separate coils comprising:
  (a) an arbor portion substantially square shaped and having a window opening therethrough;
    (1) a plurality of equally spaced serrations along each edge of said arbor;
  (b) flanges integral with said arbor;
    (1) said flanges being substantially rectangular in shape with small flange portions on two opposite sides of said arbor and elongated flange portions on the other two opposite sides of said arbor;
    (2) said elongated flange portions having a plurality of spaced holes for the start and stop leads of each coil, said spaced holes being spaced along said elongated flange portion from said arbor to the outer edge of said elongated flange portions, one spaced hole for the start lead of one coil being substantially at the inner edge of said elongated flange portion adjacent said arbor and one spaced hole for the stop lead of another coil being substantially at the outer edge of said elongated flange portion.

(References on following page)

References Cited

UNITED STATES PATENTS

| | | | | |
|---|---|---|---|---|
| 1,997,641 | 4/1935 | Isenberg | | 242—118.7 |
| 2,781,985 | 2/1957 | Hoffstedt | | 242—118.7 X |
| 3,129,348 | 4/1964 | Simmons | | 242—118 X |
| 3,189,857 | 6/1965 | Jones | | 336—198 |
| 3,218,592 | 11/1965 | Barrick | | 242—118.4 X |
| 3,334,841 | 8/1967 | Burhop | | 242—118.7 |

GEORGE F. MAUTZ, Primary Examiner

U.S. Cl. X.R.

336—198